(12) United States Patent
Wu et al.

(10) Patent No.: US 12,316,969 B2
(45) Date of Patent: May 27, 2025

(54) CAMERA DEVICE

(71) Applicant: Lanto Electronic Limited, Kunshan (CN)

(72) Inventors: Fu-Yuan Wu, Taipei (TW); Shang-Yu Hsu, Taipei (TW); Yu-Cheng Lin, Taipei (TW)

(73) Assignee: LANTO ELECTRONIC LIMITED, Kunshan (CN)

( * ) Notice: Subject to any disclaimer, the term of this patent is extended or adjusted under 35 U.S.C. 154(b) by 119 days.

(21) Appl. No.: 18/113,827

(22) Filed: Feb. 24, 2023

(65) Prior Publication Data

US 2023/0276129 A1      Aug. 31, 2023

(30) Foreign Application Priority Data

Feb. 25, 2022    (CN) .......................... 202210180303.0
May 27, 2022    (TW) ................................. 111119947

(51) Int. Cl.
| | |
|---|---|
| H04N 23/68 | (2023.01) |
| G03B 30/00 | (2021.01) |
| H04N 23/45 | (2023.01) |
| H04N 23/54 | (2023.01) |
| H04N 23/55 | (2023.01) |
| H04N 23/57 | (2023.01) |
| H04N 23/58 | (2023.01) |

(52) U.S. Cl.
CPC ........... *H04N 23/687* (2023.01); *H04N 23/54* (2023.01); *H04N 23/55* (2023.01); *H04N 23/686* (2023.01)

(58) Field of Classification Search
CPC ........ H04N 23/54; H04N 23/55; H04N 23/45; H04N 23/50; H04N 23/57; H04N 23/58; H04N 23/686; H04N 23/687; G03B 30/00; G03B 2215/0517; G03B 2215/0521

See application file for complete search history.

(56) References Cited

U.S. PATENT DOCUMENTS 12,061,410 B2 *   8/2024   Wu ......................... G03B 7/28
2017/0155816 A1   6/2017   Ito et al.
(Continued)

FOREIGN PATENT DOCUMENTS

| CN | 110099198 A | 8/2019 |
|---|---|---|
| CN | 113301230 A | 8/2021 |
| WO | WO 2021/242079 A1 | 12/2021 |

*Primary Examiner* — Marly S Camargo
(74) *Attorney, Agent, or Firm* — Birch, Stewart, Kolasch & Birch, LLP

(57) ABSTRACT

A camera device comprises an image sensor, a first moving module and two groups of second moving modules. The first moving module is connected to the image sensor. The first moving module is activated to move the image sensor linearly along a first axis. The second moving module is connected to the image sensor. The second moving module is activated to move the image sensor linearly along a second axis, which intersects with the first axis. The two groups of second moving modules are activated simultaneously to rotate the image sensor around a third axis, which is orthogonal to the first and second axes, respectively. The image sensor compensates for the image by linear movement in the direction of the first axis and the second axis and can also compensate for the image by rotation in the direction of the third axis to achieve three-axis image stabilization.

17 Claims, 12 Drawing Sheets

(56) References Cited

U.S. PATENT DOCUMENTS

| | | | |
|---|---|---|---|
| 2019/0238728 A1* | 8/2019 | Hwang | H04N 23/57 |
| 2022/0311916 A1* | 9/2022 | Rho | H04N 23/55 |
| 2023/0004063 A1* | 1/2023 | Rathnasinghe | G03B 30/00 |
| 2023/0209162 A1* | 6/2023 | Kim | G03B 17/02 |

* cited by examiner

CAMERA DEVICE

CROSS-REFERENCE TO RELATED APPLICATION

This application claims the priority benefits of Chinese Patent Application Serial Number 202210180303.0, filed on Feb. 25, 2022, and Taiwan Patent Application Serial Number 111119947, filed on May 27, 2022, the full disclosures of which are incorporated herein by reference.

BACKGROUND

Technical Field

The present disclosure relates to the technical field of the camera device, particularly to a camera device in which an image sensor could move linearly in two directions perpendicular to the optical axis of an optical imaging module, and the image sensor could rotate around a direction parallel to the optical axis of the optical imaging module for a three-axis image stabilization.

Related Art

Smartphones are generally equipped with camera devices for shooting pictures at any time. To zoom in or out when taking pictures, phone camera devices are normally capable of zooming functions, including digital zoom and optical zoom. Digital zooming refers to directly enlarging or reducing a captured image by the processor of the phone so that distortion could be seen on processed images presenting the image quality as grainy and rough. Optical zooming refers to zoom by moving the lens in camera devices. Since optical zooming could change the focal length of the lens for capturing images, the captured results could have excellent image quality. According to demands requesting progressed camera image quality, manufacturers had recently started installing optical-zoomed camera devices onto smartphones.

And since thinning for conventional smartphones is also crucial, reducing the thickness of the smartphone casing would limit the moving distance of the lens to a considerable extent, so it is difficult to achieve a high power zoom. So it is generally desirable that the lens of camera devices could be arranged along the length or width direction of the phone casing, rather than along the thickness direction, for a longer movement margin for the lens to achieve high power optical zoom. Under such design limit conditions, then the periscope-type zoom lens came into the real world. The periscope type zoom lens refers to dispose a prism in front of the lens, which reflects light entering the phone case from the outside and bends the light path. The reflected light travels along the length or width directions of the phone case and then enters the lens.

When shooting with a phone camera, it is normal that the holding hand cannot be completely stabilized. To improve image quality, image stabilization is usually equipped for handshake compensation. Conventional periscope-type lenses could compensate by moving the lens in two directions, parallel and perpendicular to the optical axis of the lens. However, the short moving stroke and the two-way-only linear movement had limited the effect of stabilization, so it is difficult to capture images with excellent quality.

SUMMARY

The embodiments of the present disclosure provide a camera device tended to solve the problem of poor image stabilization of conventional phone cameras that can only move in two directions for compensation.

The present disclosure provides a camera device, comprising: an image sensor, a first moving module, and at least one group of second moving modules. The light travels along the optical axis of the optical imaging module to generate an optical image. The image sensor receives the optical image to generate an image signal. The first moving module is connected to the image sensor and is activated to move the image sensor linearly along the first axis. At least two groups of second moving modules are connected to the image sensor and are configured to activate the second moving modules to move the image sensor linearly along the second axis. The second axis intersects with the first axis. The first moving module or/and the at least one group of the second moving modules are activated to rotate the image sensor around a third axis. An axial rotation of the image sensor is generated by a thrust differential of the first and second axes.

The embodiment of the present disclosure comprises two groups of second mobile modules, the at least two groups of second moving modules are respectively disposed at two opposite sides of the image sensor and are parallel to a force direction of the image sensor with a predetermined distance. At least two groups of second moving modules are simultaneously activated to enable the image sensor to move linearly along the second axis or to rotate the image sensor around the third axis.

The embodiment of the present disclosure further comprises a baseplate carrying the image sensor. The first moving module and the at least one group of second moving modules are connected to the baseplate. The first moving module or the at least one group of second moving modules is configured to enable the baseplate to linearly move along the first axis, to linearly move along the second axis, or to rotate about the third axis.

The baseplate is a flexible circuit board. The baseplate comprises a baseplate body, two bending parts disposed on two opposite sides of the baseplate body, and two electrical connectors disposed at the two bending parts. Each of the bending parts is connected to the corresponding electrical connector and the baseplate body. The two bending parts and the baseplate body comprise a first bending angle. The image sensor is electrically connected to the electrical connector through the flexible circuit board.

Each of the bending parts comprises a first bending sheet and a second bending sheet. The first bending sheet is connected to the baseplate body, and the first bending angle is formed between the first bending sheet and the baseplate body. The second bending sheet is connected to the first bending sheet. A second bending angle is formed between the second and first bending sheets. The electrical connector is connected to the second bending sheet.

The two first bending sheets are respectively connected to two opposite ends of the baseplate body along the first axis. Each of the first bending sheets is bent relative to the baseplate body along the third axis to form the first bending angle. Each of the second bending sheets is connected to one end of the corresponding first bending sheet away from the baseplate body along the third axis. Each of the second bending sheets is bent relative to the first bending sheet along the first axis to form the second bending angle.

Each of the bending parts further comprises a third bending sheet. The third bending sheet and the corresponding first bending sheet are respectively connected to two adjacent side edges of the corresponding second bending sheet. A third bending angle is formed between the third bending sheet and the corresponding second bending sheet. The electrical connector is disposed at one end of the corresponding third bending sheet.

Each of the third bending sheets is connected to one end of the corresponding second bending sheet on the second axis. Each of the third bending sheets is bent relative to the corresponding second bending sheet along the third axis to form the third bending angle.

The embodiment of the present disclosure further comprises a base and a sliding mechanism. The baseplate body is slidably assembled to the base through the sliding mechanism.

The sliding mechanism comprises a plurality of sliding grooves disposed at the base and a plurality of balls disposed in the sliding grooves, respectively. The baseplate is in contact with the balls.

The embodiment of the present disclosure further comprises a cover combined with the base. An accommodating space exists between the cover and the base. The baseplate body is disposed in the accommodating space.

The cover comprises a first opening and two second openings. The first opening corresponds to the image sensor. The two bending parts extend to an outer side of the accommodating space through the two second openings, respectively.

The first moving module comprises a first coil and a first magnet. The first coil or the first magnet is connected to the image sensor. The S pole and the N pole of the first magnet are arranged along the first axis. The first coil is aligned with the first magnet along the third axis.

The second moving module comprises a second coil and a second magnet. The second coil or the second magnet is connected to the image sensor. The S pole and the N pole of the second magnet are arranged along the second axis. The second coil is aligned with the second magnet along the third axis. The two second coils are configured to linearly move the two second magnets along the second axis by electric currents in the same direction, or to rotate the two second magnets about the third axis by electric currents in opposite direction.

The embodiment of the present disclosure further comprises a baseplate supporting the image sensor. The first coil and the second coil are disposed at the baseplate. Or, the first and second magnets are disposed at the baseplate.

The baseplate is disposed between the first magnet and the first coil. The baseplate is disposed between the second magnet and the second coil.

The embodiment of the present disclosure further comprises a carrying plate. The first coil and the second coil are disposed at the carrying plate. The baseplate is secured to the carrying plate. Or, the baseplate and the carrying plate can move relatively.

The embodiment of the present disclosure further comprises an optical imaging module. The image sensor is disposed corresponding to an optical axis of the optical imaging module. The first and second axes are perpendicular to the optical axis of the optical imaging module. The third axis is parallel to the optical axis of the optical imaging module.

The embodiment of the present disclosure further comprises an optical path bending module configured to change the traveling direction of light so that the light would pass through the optical imaging module along the optical axis.

In the embodiments of the present disclosure, by the camera device of the embodiment of the present disclosure provided with a first moving module and a second moving module, the image sensor could be moved linearly along the first axis direction when the first moving module is activated and the image sensor could be moved linearly along the second axis direction, while the first axis and the second axis intersect. So, when the two second moving modules are activated at the same time, the sum of the moments generated by the two second moving modules relative to the third axis to the image sensor would rotate the image sensor around the third axis clockwise or counterclockwise, then the image sensor could compensate captured images by linear movement in the first axis and the second axis directions, while compensating by rotation in the third axis direction at the same time for a three-axis image stabilization. Although the embodiments of the present disclosure take a periscope-type lens as an example for description, the present disclosure is not limited to periscope type lens, general optical lenses are also applicable.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments are believed to be novel, and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and the following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
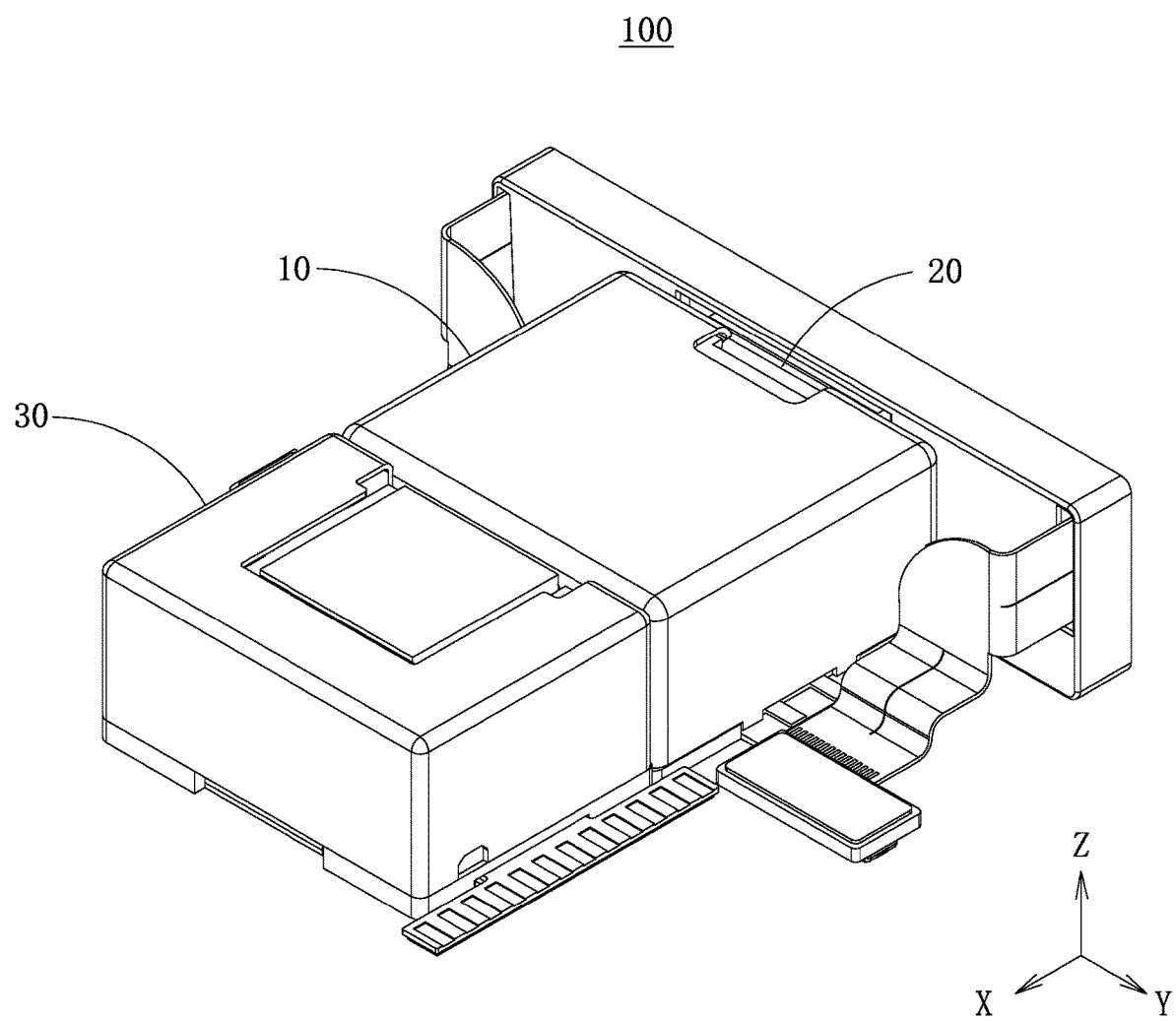
FIG. 1 is a perspective view of a camera device of an embodiment of the present disclosure.
Figure 2:
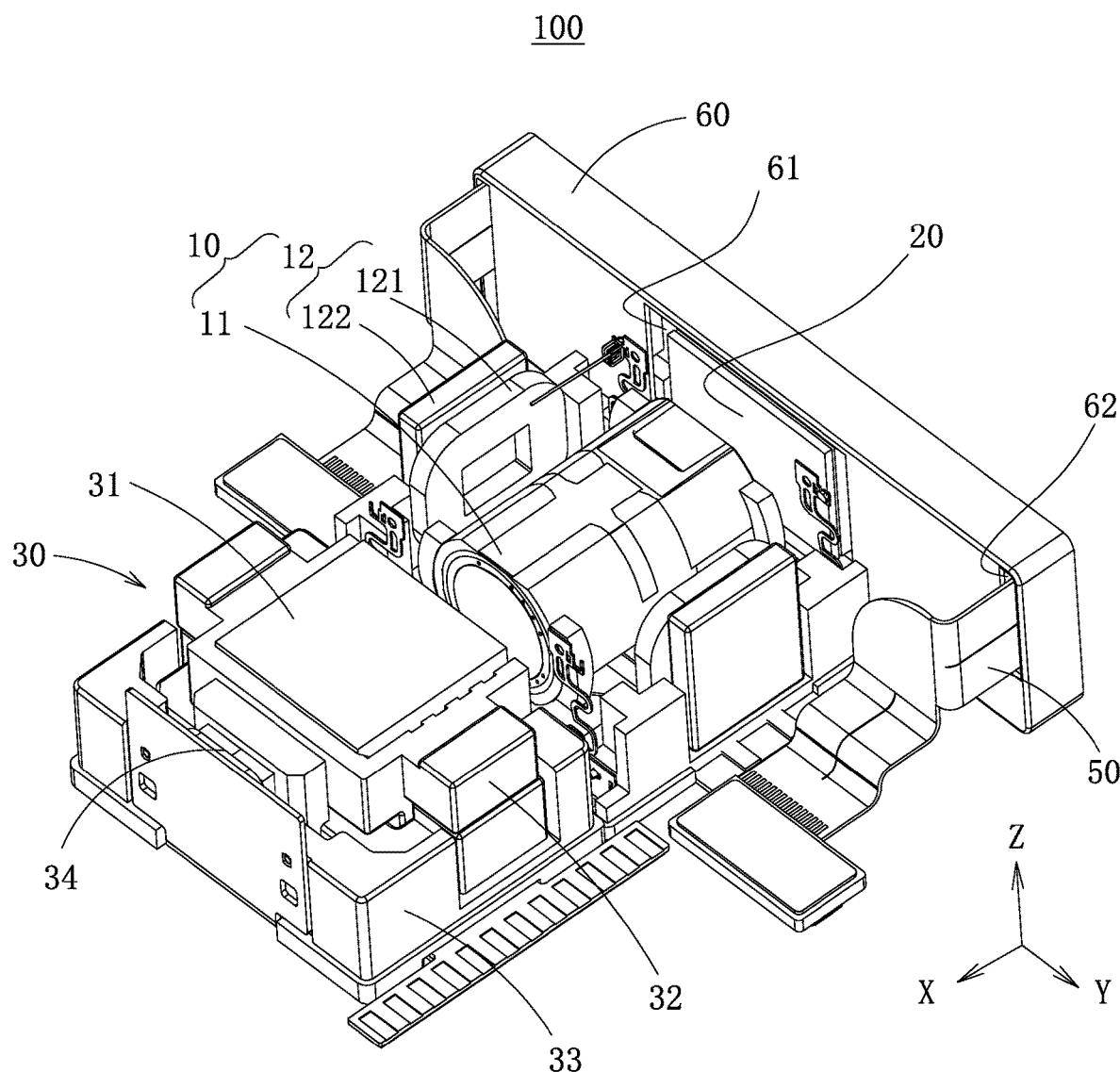
FIG. 2 is a perspective view of an optical imaging module and the optical path bending module in the camera device of FIG. 1 after the cover was removed.
Figure 3:
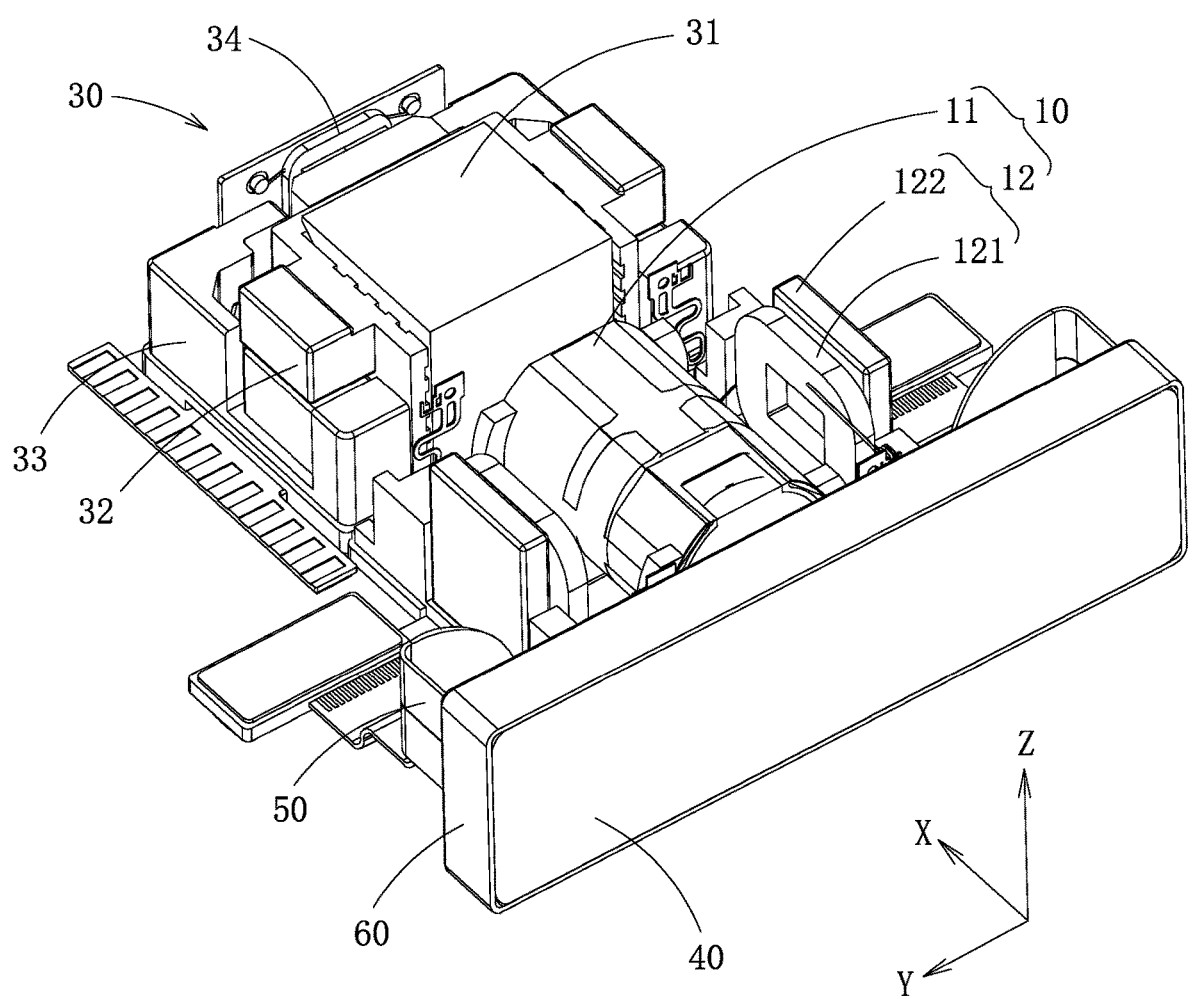
FIG. 3 is a perspective view of the camera device of FIG. 2 in a different perspective.
Figure 4:
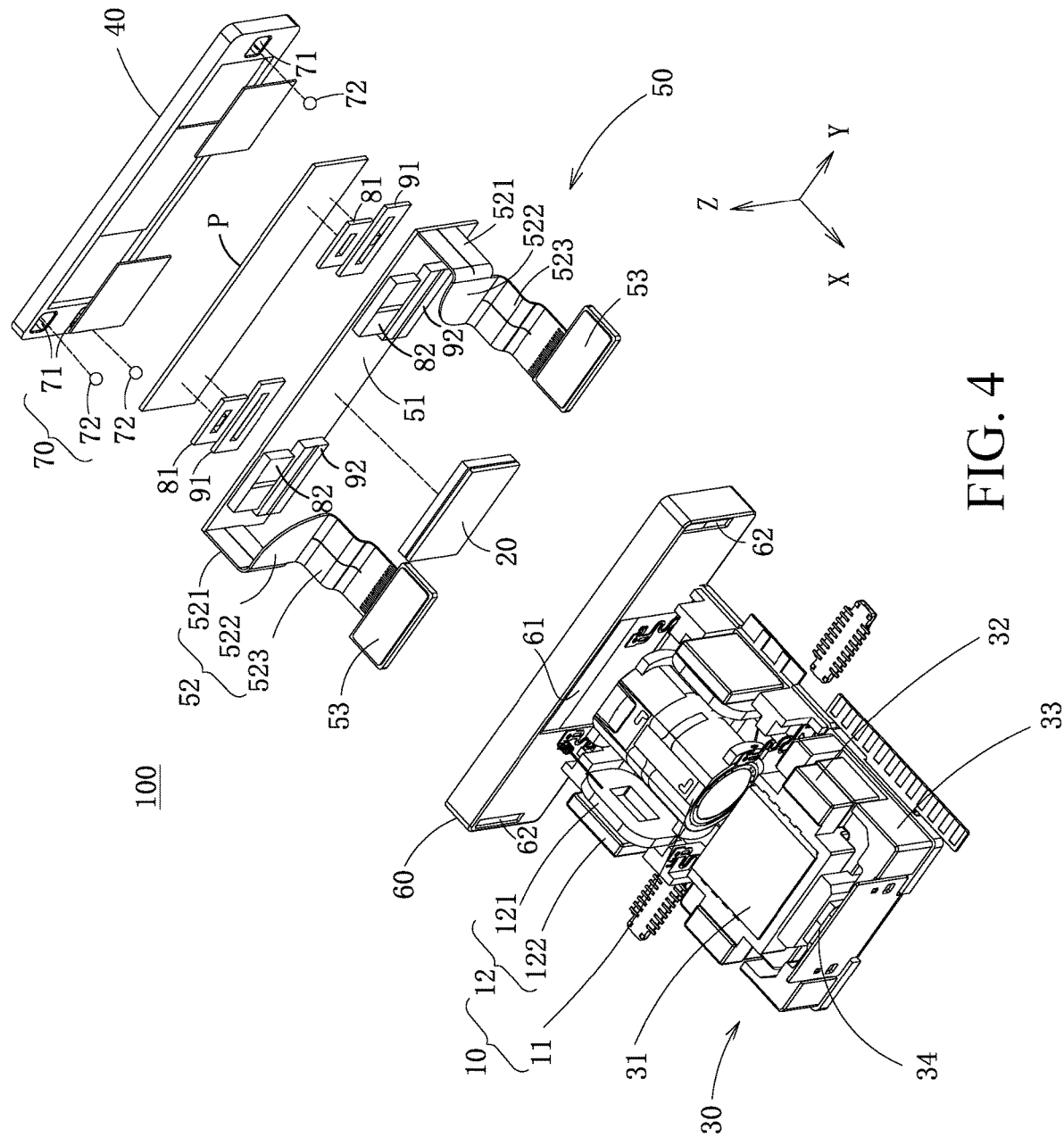
FIG. 4 is an exploded view of the camera device of FIG. 2.
Figure 5:
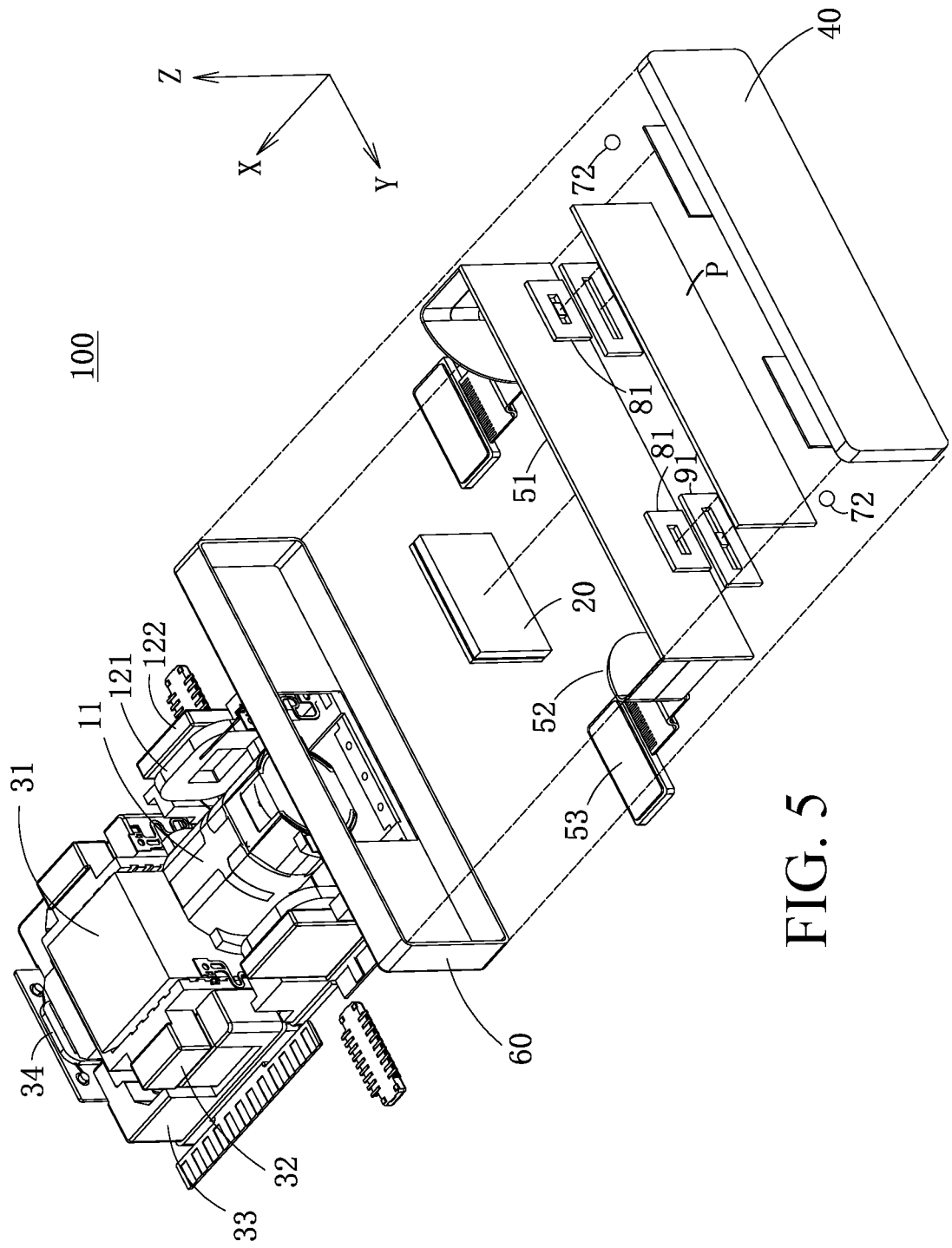
FIG. 5 is an exploded view of the camera device of FIG. 3.

FIG. 1 is a perspective view of a camera device of an embodiment of the present disclosure. FIG. 2 is a perspective view of an optical imaging module and the optical path bending module in the camera device of FIG. 1 after the cover is removed. FIG. 3 is a perspective view of the camera device of FIG. 2 in a different perspective. FIG. 4 is an exploded view of the camera device of FIG. 2. FIG. 5 is an exploded view of the camera device of FIG. 3. As shown in the figures, in this embodiment, the camera device 100 comprises an optical imaging module 10 and an image sensor 20. In this embodiment, the camera device 100 further comprises an optical path bending module 30.

In this embodiment, the optical imaging module 10 comprises a lens group 11 and a focusing mechanism 12. The lens group 11 comprises a plurality of lenses whose optical axes are parallel to the X direction (the third axis to be described later). The focusing mechanism 12 is disposed on two sides of the lens group 11, and comprises a coil 121 and a permanent magnet 122. The coil 121 is provided in the lens group 11 (in order to present the lens group 11 clearly, the lens group cover on which the coil 121 is provided is omitted). When an electric current passes through the coil 121, a magnetic force would be generated, and the magnetic force of the coil 121 and the magnetic force of the permanent magnet 122 would be mutually attracted or repelled so that the lens group 11 could move along the X direction to zoom and focus.

In this embodiment, the optical path bending module 30 comprises an optical path bending part 31, a securing base 32, and a moving base 33. The optical path bending part 31 is installed on the moving base 33. By disposing two groups of moving modules 34 and 35 between the securing base 32 and the moving base 33 (see FIG. 10), the moving base 33 is movable on the securing base 32 in the X direction and the Y direction (the first axis to be described later). The two moving modules 34 and 35 are both comprising coils and permanent magnets. When an electric current passes through the coil, a magnetic force is generated. The magnetic force of the coil and the magnetic force of the permanent magnet would be mutually attracted or repelled so that the moving base 33 could move relative to the securing base 32 to compensate for a handshake. In this embodiment, the optical path bending member 31 is a prism. External light could enter the optical path bending member 31 and is reflected at the interface of the prism to bend the optical path, and the reflected light could enter the optical imaging module 10. In another embodiment, the optical path bending member can also be, for example, a flat mirror.

Figure 10:
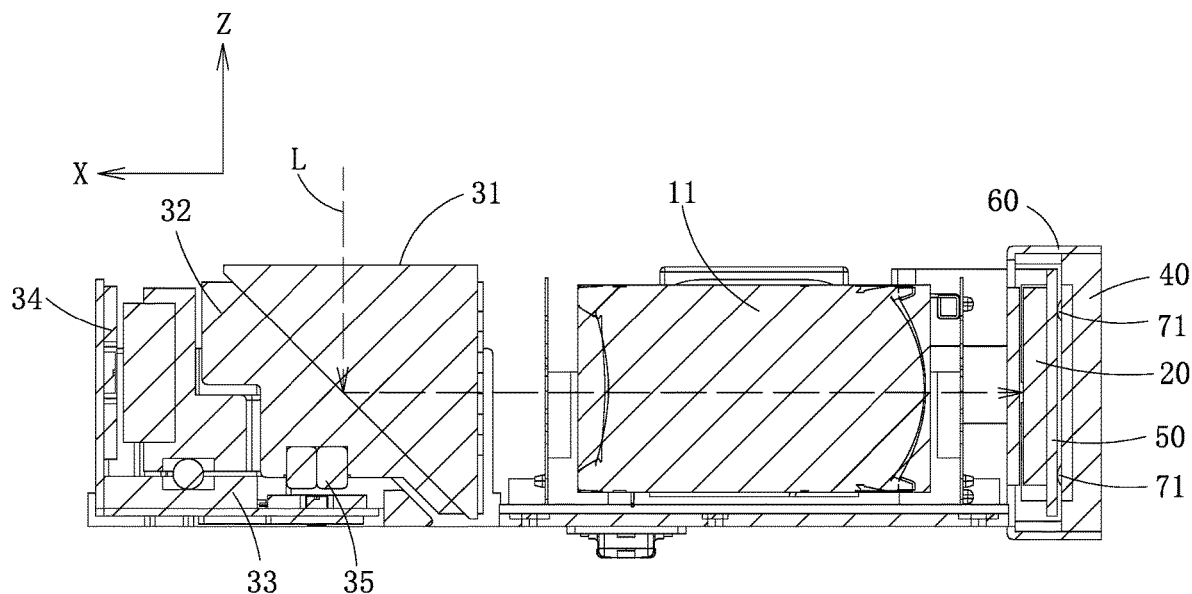
FIG. 10 is a cross-sectional view along line B-B in FIG. 8.
Figure 11:
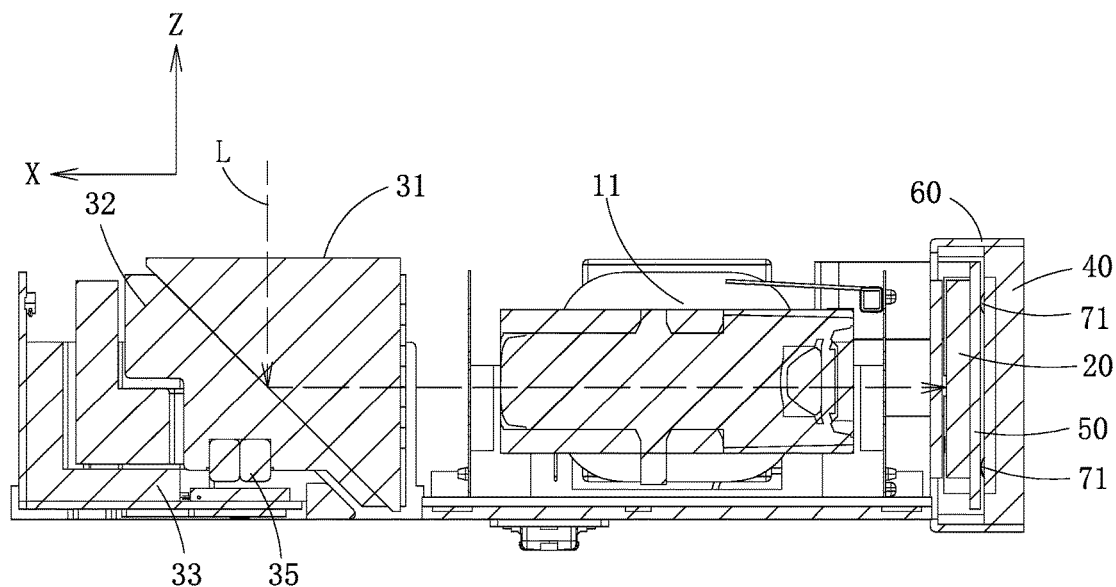
FIG. 11 is a cross-sectional view along line C-C in FIG. 8.

As shown in FIG. 10 and FIG. 11, the light L is reflected by the light path bending member 31 of the light path bending module 30 and passes through the lens group 11. The focusing mechanism 12 could move the lens group 11 along the X direction to generate an optical image at the image sensor 20. The image sensor 20 receives the optical image and converts it into an image signal.

In the camera device 100 of the present disclosure, besides the optical path bending module 30 can compensate the image by moving the optical path bending member 31 in the X direction and the Y direction by two sets of moving modules, the image sensor 20 can also move and rotate. This can produce higher compensation for a handshake, thereby improving image quality. The mechanism for moving and rotating the image sensor 20 would be described in below. The camera device 100 of the present disclosure is not limited to the embodiment having the optical path bending module 30, and can also be applied to embodiments without the optical path bending module 30, to realize image stabilization by moving and rotating the image sensor 20 for image compensation.

As shown in FIG. 4 and FIG. 5, the imaging device 100 of the present disclosure further comprises a base 40, a baseplate 50 and a cover 60. The image sensor 20 is disposed on the baseplate 50; that is, the baseplate 50 supports the image sensor 20. The baseplate 50 is disposed at the base 40, the cover 60 covers the base 40, and an inner surface of four side edges of the cover 60 abut against an outer surface of four side edges of the base 40. In this way, the base 40 and the cover 60 could form an accommodating space, and the baseplate 50 could be disposed in the accommodating space, and the moving range of the base 50 is restricted by the side edges of the cover 60. The cover 60 is disposed close to the lens group 11 of the optical imaging module 10 and comprises a first opening 61, which is aligned with the image sensor 20. So, light can be imaged on the image sensor 20 without being blocked by the cover 60 after passing through the lens group 11.

Figure 7:
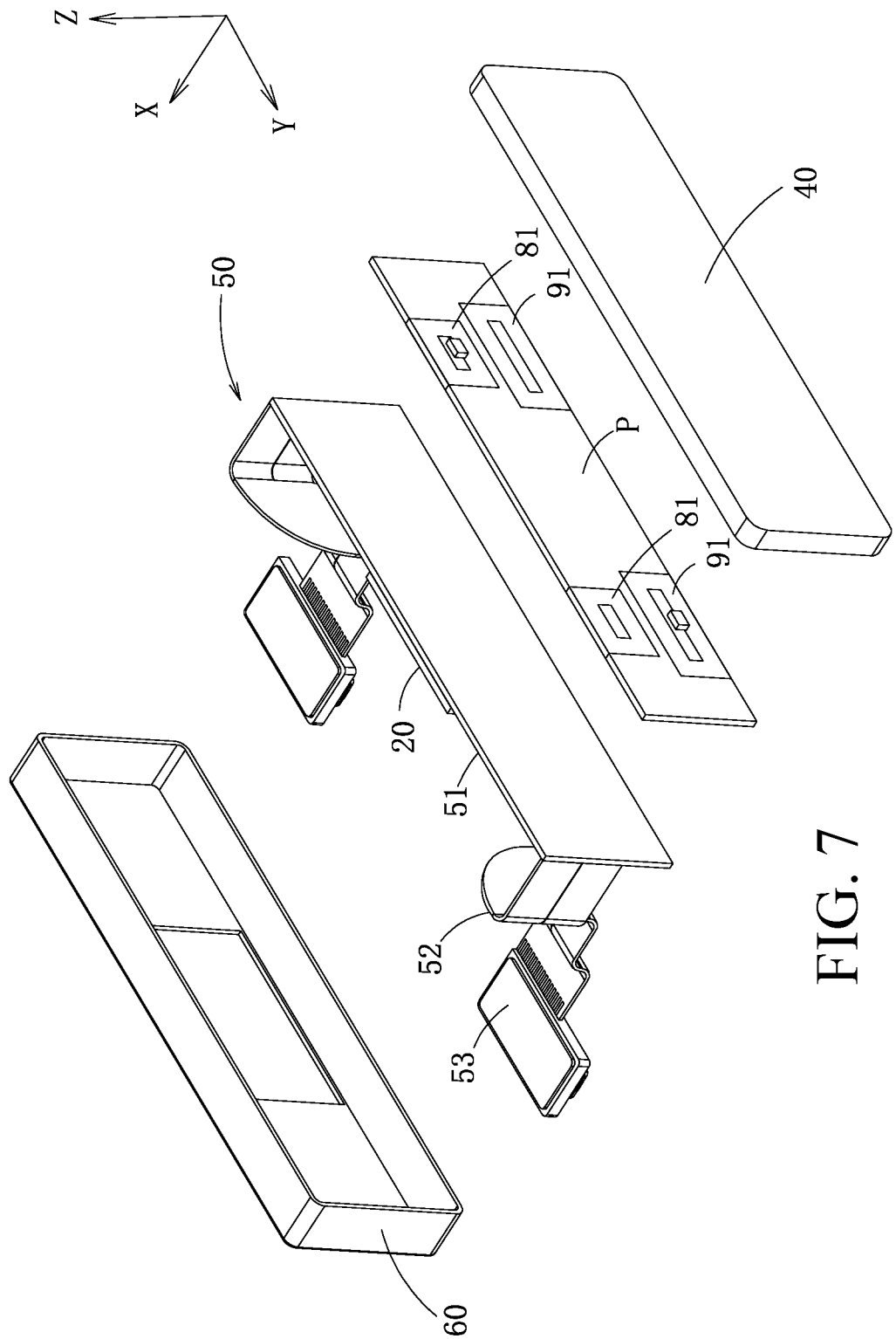
FIG. 7 is an exploded view of the camera device of FIG. 6 in a different perspective.
Figure 8:
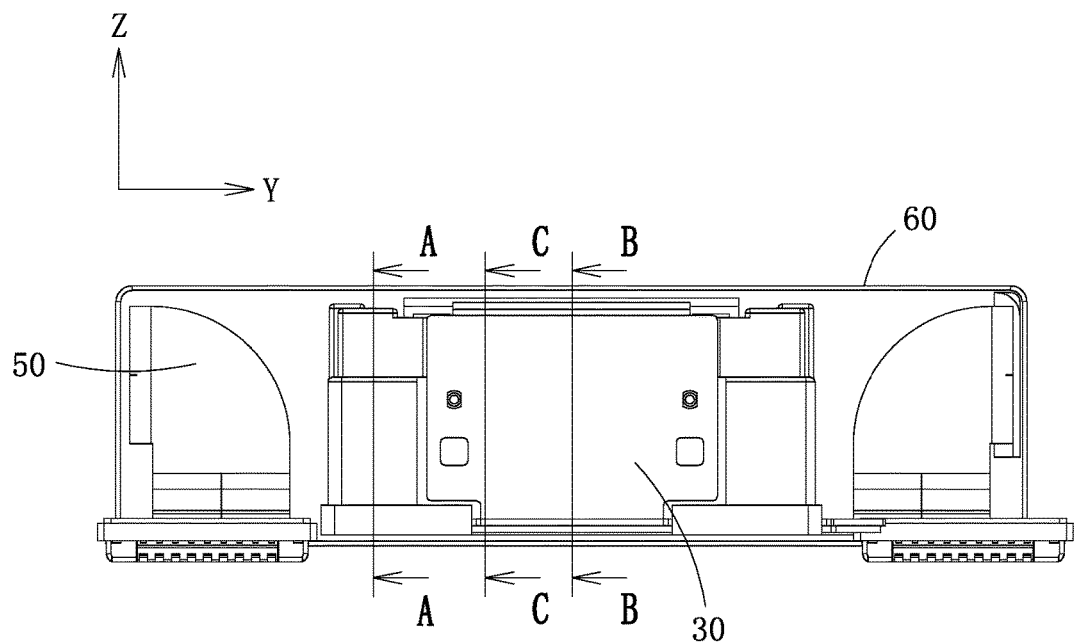
FIG. 8 is a front view of the camera device of FIG. 1.
Figure 9:
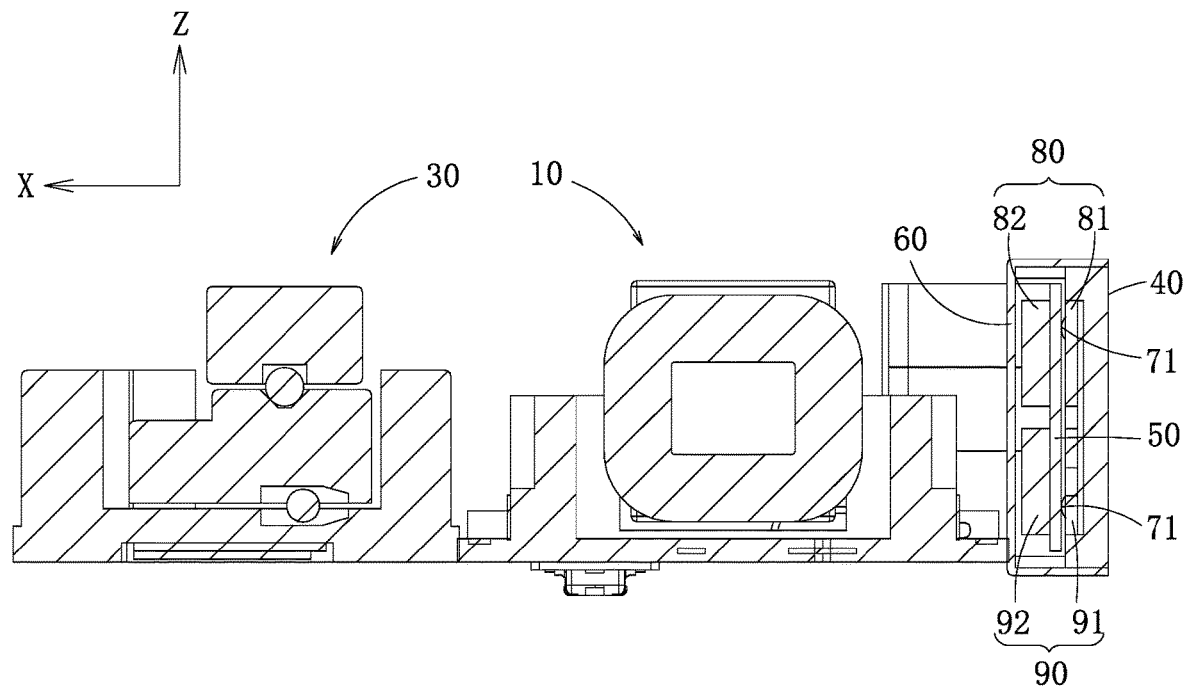
FIG. 9 is a cross-sectional view along line A-A in FIG. 8.

The camera device 100 of the present disclosure further comprises a sliding mechanism 70, which is disposed at the base 40. In this embodiment, the sliding mechanism 70 comprises a plurality of sliding grooves 71 disposed at the base 40 and a ball 72 respectively disposed in the plurality of sliding grooves 71. The baseplate 50 could slide on the base 40 through the contact between the base 40 and the ball 72. In this embodiment, the sliding mechanism 70 comprises three sliding grooves 71 and three balls 72. Wherein two sliding grooves 71 are disposed at one side edge close to the base 40, the other sliding groove 71 is disposed at the other opposite side edge close to the base 40, and the balls 72 are disposed in cooperation with the sliding grooves 71. In this embodiment, the sliding groove 71 is rectangular; the diameter of the ball 72 is smaller than the length and width of the sliding groove 71, but the diameter of the ball 72 is greater than the depth of the sliding groove 71. So, when the balls 72 are disposed in the sliding groove 71, in addition to providing a space for accommodating the balls 72 to prevent the balls 72 from falling off, the balls 72 can also roll within a limited distance in the sliding groove 71. As shown in FIG. 7, FIG. 8, and FIG. 9, the balls 72 are protruding from the sliding groove 71 to a surface of the base 40. In this way, the balls 72 could support the baseplate 50 in a rolling manner, thereby reducing the frictional force between the baseplate 50 and the base 40 and providing the freedom of the baseplate 50 to slide relative to the base 40.

In this embodiment, the baseplate 50 is a flexible circuit board, comprising a baseplate body 51, two bending parts 52 disposed on two opposite side edges of the baseplate body 51, and an electrical connector 53 disposed on the two bending parts 52. Each of the bending parts 52 is connected to the corresponding electrical connector 53 and the baseplate body 51, the two bending parts 52 and the baseplate body 51 comprise a first bending angle, the image sensor 20 is disposed at the baseplate body 51, and the baseplate body 51 is slidably assembled to the base 40 through the balls 72. The baseplate 50 is provided with a metal circuit which extends from the baseplate body 51 to the electrical connector 53 through the bending part 52. Image signals generated by the image sensor 20 could be transmitted to an external electronic device, such as a smart phone equipped with the camera device 100 of the present disclosure, through the baseplate body 51, the bending part 52 and the electrical connector 53. By disposing the bending parts 52 on two opposite sides of the baseplate body 51, a margin for the movement of the baseplate body 51 can be provided to effectively reduce the reaction force generated by the insertion structure of the electrical connector 53 and the circuit board of electronic device on the movement of the baseplate 50, avoiding the restriction to the movement of the baseplate 50 by the above-mentioned insertion structure. In this way, the image sensor 20 can be moved and rotated by moving and rotating the baseplate 50 to achieve multi-axis image compensation and image stabilization. The cover 60 further comprises two second openings 62 disposed close to the side edges of the cover 60. The two bending parts 52 respectively extend through the second openings 62 to an outer side of the accommodating space formed by the cover 60 and the base 40.

In some embodiments, each of the bending parts 52 comprises a first bending sheet 521 and a second bending sheet 522. The first bending sheet 521 is connected to the baseplate body 51. A first bending angle is formed between the first bending sheet 521 and the baseplate body 51. The second bending sheet 522 is connected to the first bending sheet 521. A second bending angle is formed between the second bending sheet 522 and the first bending sheet 521. The electrical connector 53 is connected to the second bending sheet 522. In some embodiments, the two first bending sheets 521 are respectively connected to two opposite ends of the baseplate body 51 along the Y direction (the first axis), and each of the first bending sheet 521 is bent relative to the baseplate body 51 along the X direction (third axis) to form a first bending angle. Each of the second bending sheets 522 is connected to one end of the corresponding first bending sheet 521 away from the baseplate body 51 in the X direction, and each of the second bending sheets 522 is bent in the Y direction relative to the first bending sheet 521 to form a second bending angle. In some embodiments, the second bend angle is equal to the first bend angle. For example, the second and first bending angles are respectively 90 degrees, so the second bending sheet 522 is parallel to the baseplate body 51. Each of the bending parts 52 further comprises a third bending sheet 523 connected to the second bending sheet 522. The third bending sheet 523 and the first bending sheet 521 are respectively connected to t two adjacent side edges of the second bending sheet 522. A third bending angle is formed between the third bending sheet 523 and the second bending sheet 522, and the electrical connector 53 is disposed at the end of the third bending sheet 523. In some embodiments, each of the third bending sheets 523 is connected to one end of the corresponding second bending sheet 522 in the Z direction (the second axis described later), and is bent along the X direction relative to the second bending sheet 522 to form a third bending angle. In some embodiments, the third bend angle equals to 90 degrees. In some embodiments, the two first bending sheets 521 and the two third bending sheets 523 could extend in the same direction, and the two second bending sheets 522, respectively, extend in opposite directions.

The camera device 100 of the present disclosure further comprises a first moving module 80 and a second moving module 90. Refer to FIG. 4, FIG. 5, and FIG. 9, the camera device 100 of the present disclosure further comprises a carrying plate P secured to the base 40, enabling a relative movement between the baseplate body 51 and the carrying plate P. The first moving module 80 comprises a first coil 81 and a first magnet 82. In this embodiment, the first coil 81 is disposed on the carrying plate P, the first magnet 82 is disposed on the baseplate body 51, and the S and N poles of the first magnet 82 are arranged along the first axis (Y direction). When electric current passes through the first coil 81, it would generate a magnetic force and would interact with the magnetic force of the first magnet 82. In this way, the first magnet 82 and the baseplate body 51 on which the first magnet 82 is disposed can be moved along the first axis direction, thereby enabling the movement of the image sensor 20 along the first axis direction.

Figure 6:
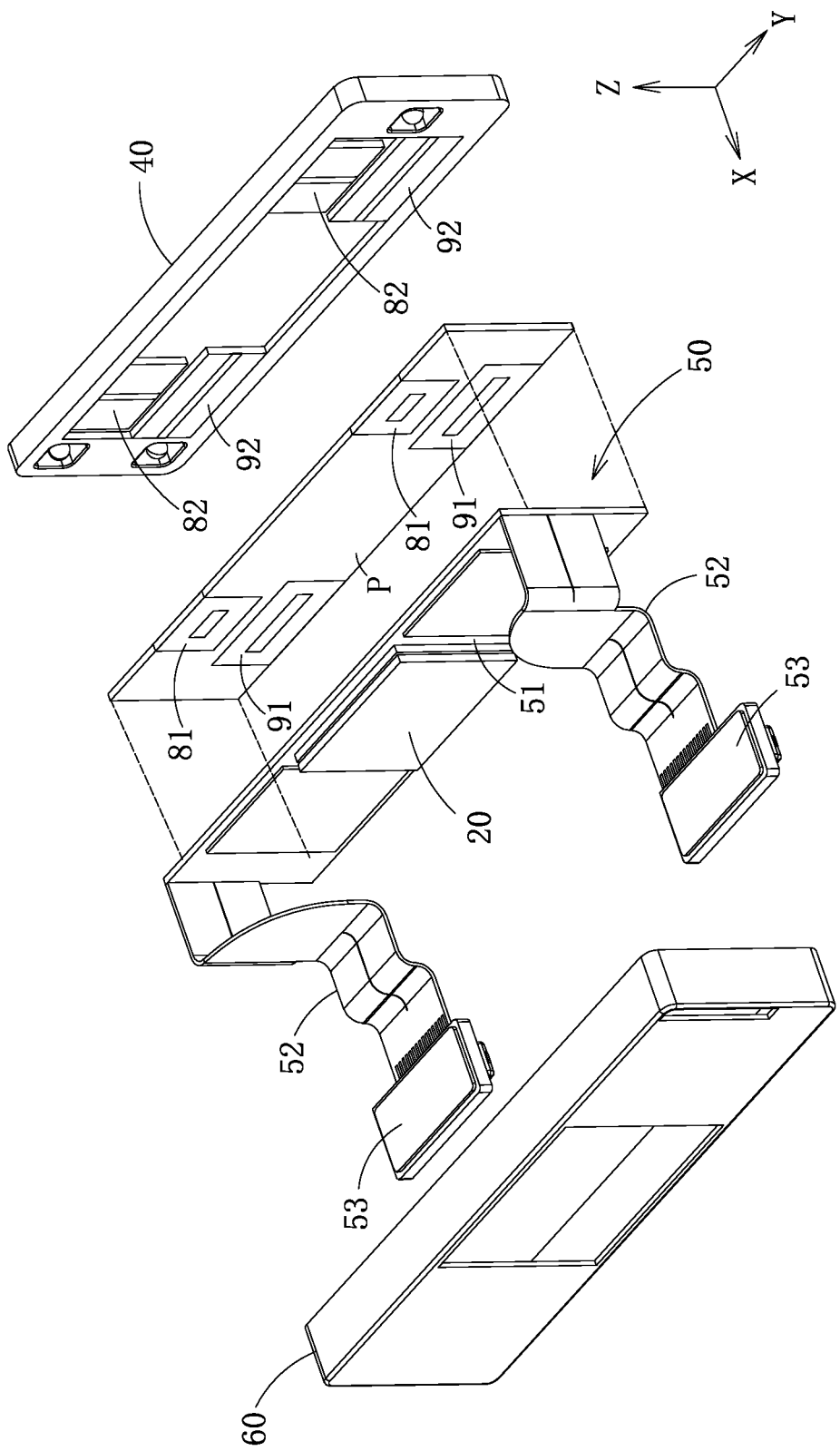
FIG. 6 is an exploded view of a camera device of another embodiment of the present disclosure.

However, the present disclosure is not limited thereto; refer to FIG. 6 and FIG. 7, FIG. 6 is an exploded view of a camera device of another embodiment of the present disclosure, and FIG. 7 is an exploded view of the camera device of FIG. 6 in a different perspective. In this embodiment, the carrying plate P is secured to the baseplate body 51, the first coil 81 is disposed on the carrying plate P, and the first magnet 82 is secured to the base 40. The S and N poles of the first magnet 82 are arranged along the first axis (Y direction). When electric current passes through the first coil 81, the first coil 81 would generate a magnetic force and would interact with the magnetic force of the first magnet 82 so that the first coil 81 and the baseplate body 51 on which the first coil 81 is disposed would move along the first axis direction, thereby enabling the image sensor 20 to move along the first axis direction.

In another embodiment, it is also possible that the first magnet 82 is disposed at the baseplate body 51, the first coil 81 is secured to an inner surface of the cover 60, and similarly, the baseplate body 51 can be moved along the first axis direction by the electromagnetic effect generated between the first coil 81 and the first magnet 82 to move the image sensor 20 along the first axis direction. In this embodiment, the first moving module 80 comprises two first coils 81 and two first magnets 82, where the two first coils 81 are disposed at one side of the image sensor 20. In yet another embodiment, the first coil 81 could be disposed at the baseplate body 51 of the baseplate 50, and the first magnet 82 could be disposed on the inner surface of the cover 60. In another embodiment, only one or more than two of the first coil 81 and of the first magnet 82 could be provided. Besides, the baseplate 50 in this embodiment is disposed between the first coil 81 and the first magnet 82. However, the installation positions of the first coil 81 and the first magnet 82 are not limited as long as an electromagnetic effect can be generated between the first coil 81 and the first magnet 82.

Back to FIG. 4 and FIG. 5, in the embodiments therein, the second moving module 90 comprises a second coil 91 and a second magnet 92. The carrying plate P is secured to the base 40 so that the baseplate body 51 and the carrying plate P could move relatively. In this embodiment, the second coil 91 is disposed on the carrying plate P, the second magnet 92 is disposed at the baseplate body 51 of the baseplate 50, and the S and N poles of the second magnet 92 are arranged along the second axis (Z direction). When electric current passes through the second coil 91, the second coil 91 would generate a magnetic force and would interact with the magnetic force of the second magnet 92 so that the second magnet 92 and the baseplate body 51 on which the second magnet 92 is arranged move along the second axis direction, in order to move the image sensor 20 along the second axis direction.

However, the present disclosure is not limited thereto; in the embodiment shown in FIG. 6 and FIG. 7, the carrying plate P is secured to the baseplate body 51, the second coil 91 is disposed on the carrying plate P, the second magnet 92 is secured to the base 40, and the S and N poles of the second magnet 92 are arranged along the second axis (Z direction). When electric current passes through the second coil 91, the second coil 91 would generate a magnetic force and would interact with the magnetic force of the second magnet 92 so that the second coil 91 and the baseplate body 51 on which the second coil 91 is disposed could move along the second axis direction to move the image sensor 20 along the second axis direction.

In another embodiment, it is also possible that the second magnet 92 is disposed at the baseplate body 51, and the second coil 91 is disposed on the inner surface of the cover 60. Similarly, the baseplate body 51 could also be moved along the second axis direction by the electromagnetic effect generated between the second coil 91 and the second magnet 92 to move the image sensor 20 along the second axis direction. In yet another embodiment, the second coil 91 could be disposed on the baseplate body 51 of the baseplate 50, and the second magnet 92 could be disposed on the inner surface of the cover 60. In this embodiment, the second moving module 90 comprises two second coils 91 and two second magnets 92, and the two second coils 91 are disposed at one side of the image sensor 20. In another embodiment, only one or more than two of the second coil 91 and of the second magnet 92 may be provided. In another embodiment, only one or more than two of the first coil 81 and the first magnet 82 may be provided. Besides, the baseplate 50 of this embodiment is disposed between the second coil 91 and the second magnet 92. However, the installation positions of the second coil 91 and the second magnet 92 are not limited, as long as an electromagnetic effect can be generated between the second coil 91 and the second magnet 92.

Figure 12:
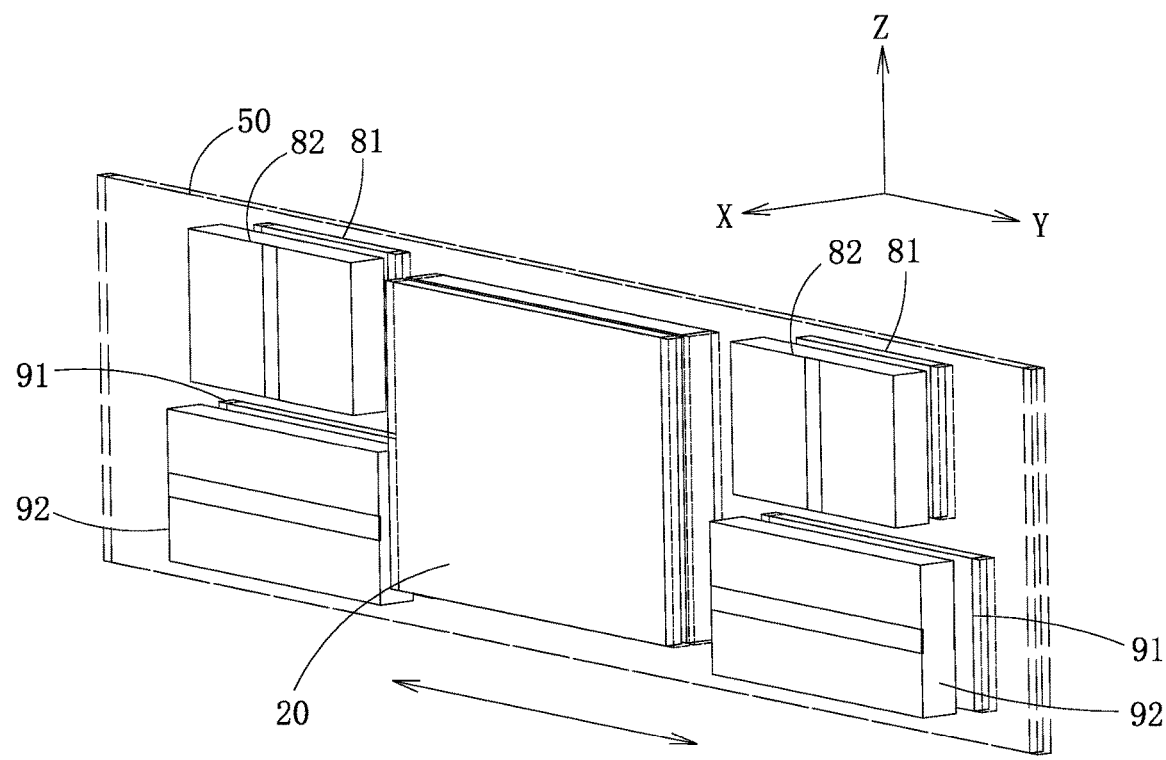
FIG. 12 is a schematic diagram of the image sensor (baseplate) moving along the first axis when the first moving module of the camera device of FIG. 1 is activated.
Figure 13:
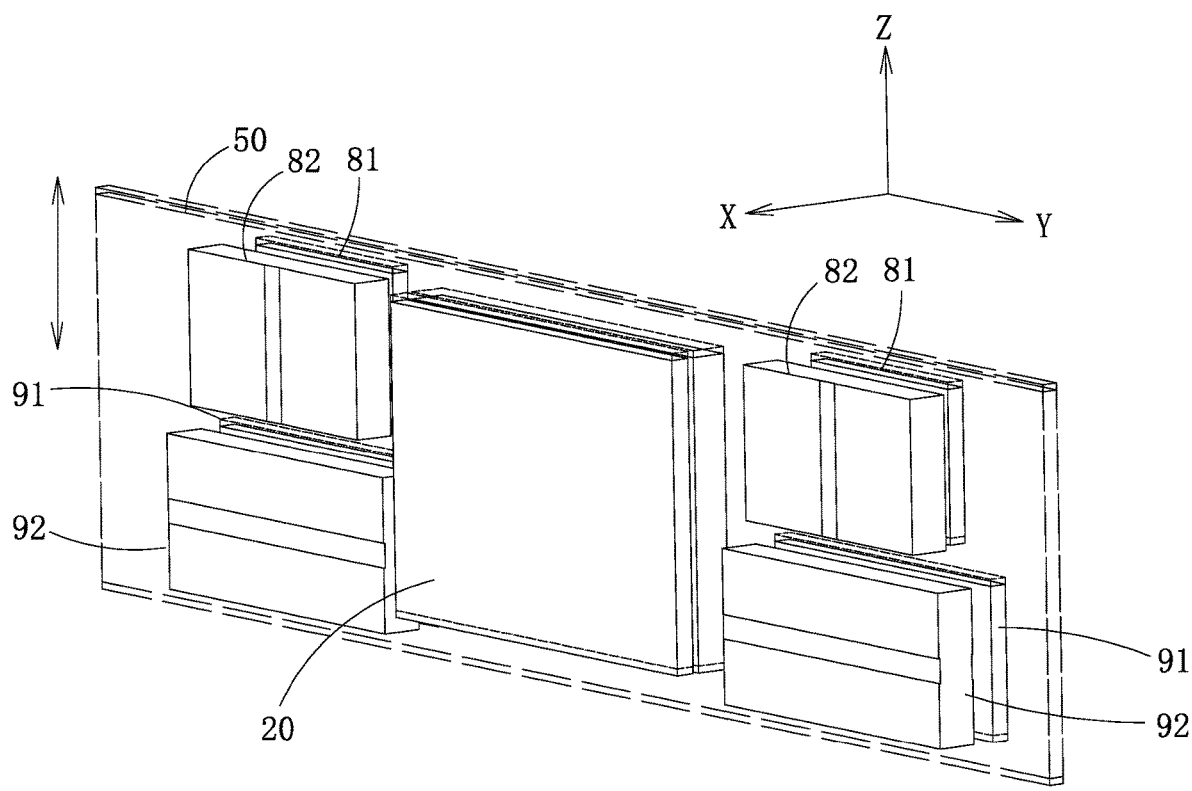
FIG. 13 is a schematic diagram of the image sensor (baseplate) moving along the second axis when the second moving module of the camera device of FIG. 1 is activated.
Figure 14:
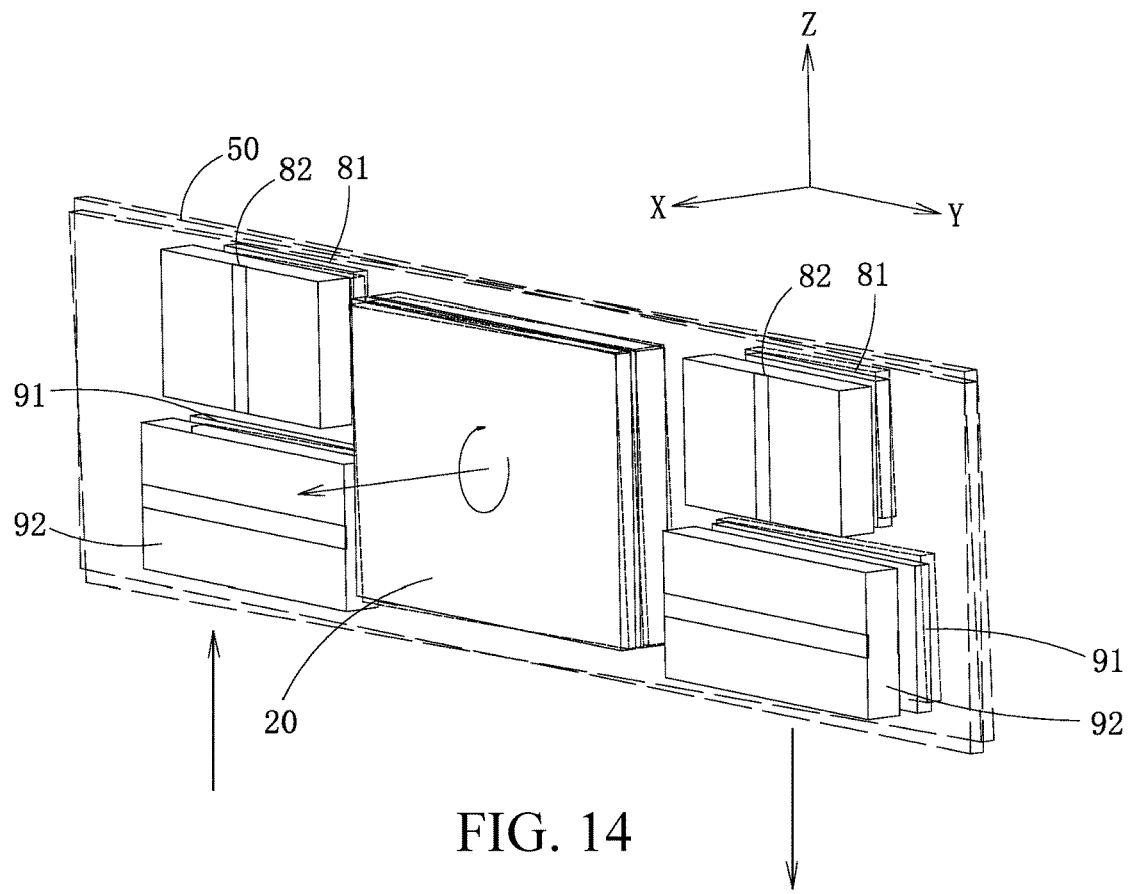
FIG. 14 is a schematic diagram of rotating the image sensor (baseplate) around the third axis when the two groups of second moving modules of the imaging device of FIG. 1 are simultaneously activated and generate forces in opposite directions.

FIG. 12 is a schematic diagram of the image sensor (baseplate) moving along the first axis when the first moving module of the camera device of FIG. 1 is activated. FIG. 13 is a schematic diagram of the image sensor (baseplate) moving along the second axis when the second moving module of the camera device of FIG. 1 is activated. FIG. 14 is a schematic diagram of rotating the image sensor (baseplate) around the third axis when the two groups of second moving modules of the imaging device of FIG. 1 are simultaneously activated.

As shown in FIG. 12, when only the first moving module 80 is activated (electric current passes through the first coil 81), the baseplate body 51 would move linearly along the first axis (Y direction) so that the image sensor 20 could move linearly along the first axis (Y direction). By changing the directionality of the electric current of the first coil 81, the magnetic force between the first coil 81 and the first magnet 82 can be alternated; thereby, the direction of the movement of the baseplate body 51 along the first axis can be changed. For example, when an electric current passes through the first coil 81 clockwise, the magnetic force would exert a positive Y direction to the first magnet 82 so that the baseplate body 51 could move toward the positive Y direction along the first axis. When electric current passes through the first coil 81 counterclockwise, the magnetic force would exert a negative Y direction on the first magnet 82 so that the baseplate body 51 could move toward the negative Y direction along the first axis.

As shown in FIG. 13, when only the second moving module 90 is activated (electric current passes through the second coil 91), the baseplate body 51 would linearly move along the second axis (Z direction) so that the image sensor 20 could linearly move along the second axis (Z direction). By changing the direction of the electric current of the second coil 91, the magnetic force between the second coil 91 and the second magnet 92 can be alternated, and the direction of the movement of the baseplate body 51 along the second axis can be changed. For example, when an electric current passes through the second coil 91 clockwise, the magnetic force would exert a positive Z direction to the second magnet 92 so that the baseplate body 51 could move toward the positive Z direction along the first axis. When electric current passes through the second coil 91 counterclockwise, the magnetic force would exert a negative Z direction to the second magnet 92 so that the baseplate body 51 could move toward the negative Z direction along the first axis. As shown in FIG. 12 and FIG. 13, if the first moving module 80 or the second moving module 90 is activated independently, the image sensor 20 could be linearly moved along the first axis (Y direction) or the second axis (Z direction) for compensation. If the first moving module 80 and the second moving module 90 are activated at the same time, by applying forces to the image sensor 20 along the first axis (Y direction) and the second axis (Z direction) by the first moving module 80 and the second moving module 90 respectively, the image sensor 20 can be moved obliquely in the Y-Z plane.

As shown in FIG. 14, when the two groups of second moving modules 90 are activated at the same time, and when electric current directions of the second coils 91 of the two groups of second moving modules 90 are going oppositely, the second magnets 92 disposed on two sides of the image sensor 20 would be subjected to forces in opposite directions, so that the image sensor 20 would rotate around the third axis (X direction). Adjusting the electric current directions of the second coils 91 of the two groups of second moving modules 90 could enable the image sensor 20 to rotate clockwise or counterclockwise. For example, when the second magnet 92 on the left is forced upward and the second magnet 92 on the right is forced downward, the image sensor 20 rotates clockwise, and when the second magnet 92 on the left is forced downward and the second magnet 92 on the right is forced upward, the image sensor 20 rotates counterclockwise.

Figure 15:
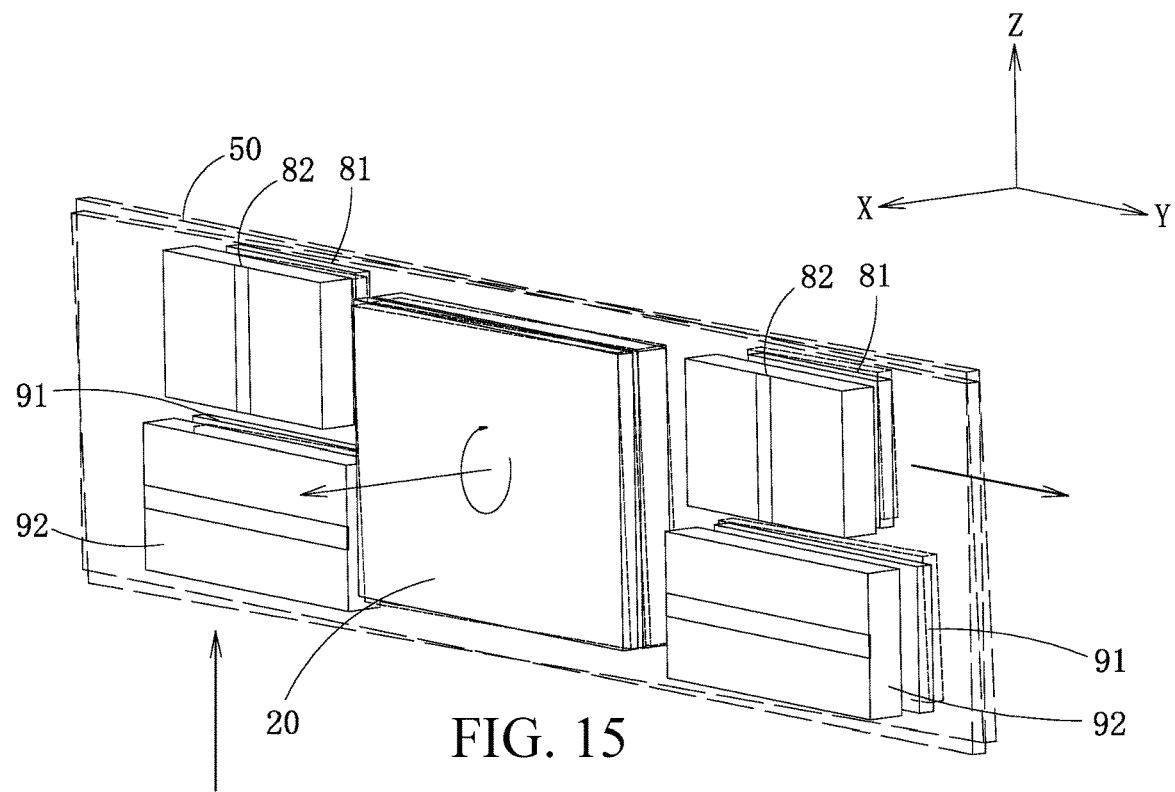
FIG. 15 is a schematic diagram of using thrust differential of the first axis and the second axis to rotate the image sensor around the third axis when a group of first moving modules and a group of second moving modules of the camera device of FIG. 1 are simultaneously activated.

In other embodiments, it is also possible that the first moving module 80 and the second moving module 90 are activated simultaneously. As shown in FIG. 15, as long as the sum of the moment generated by the first moving module 80 to the baseplate 50 and the moment generated by the second moving module 90 to the baseplate 50 is not equal to 0, the moment generated by the first moving module 80 and the second moving module 90 to the baseplate 50 would cause the baseplate 50 to rotate around the third axis (X direction), thereby to determine the direction of rotation of the baseplate 50 (clockwise or counterclockwise). In this embodiment, the first coil 81 disposed at the upper right corner of the baseplate body 51 and the second coil 91 disposed at the lower left corner of the baseplate body 51 in FIG. 12 are activated simultaneously. In this way, the first moving module 80 and the second moving module 90 can simultaneously generate a clockwise moment to the baseplate 50 so that the baseplate body 51 and the image sensor 20 could rotate in a clockwise direction around the third axis (X direction). When electric current passes through the first coil 81 and the second coil 91 in opposite directions, the first moving module 80 and the second moving module 90 would simultaneously generate a counterclockwise moment to the baseplate 50 so that the baseplate body 51 and the image sensor 20 could rotate counterclockwise around the third axis (X direction).

Figure 16:
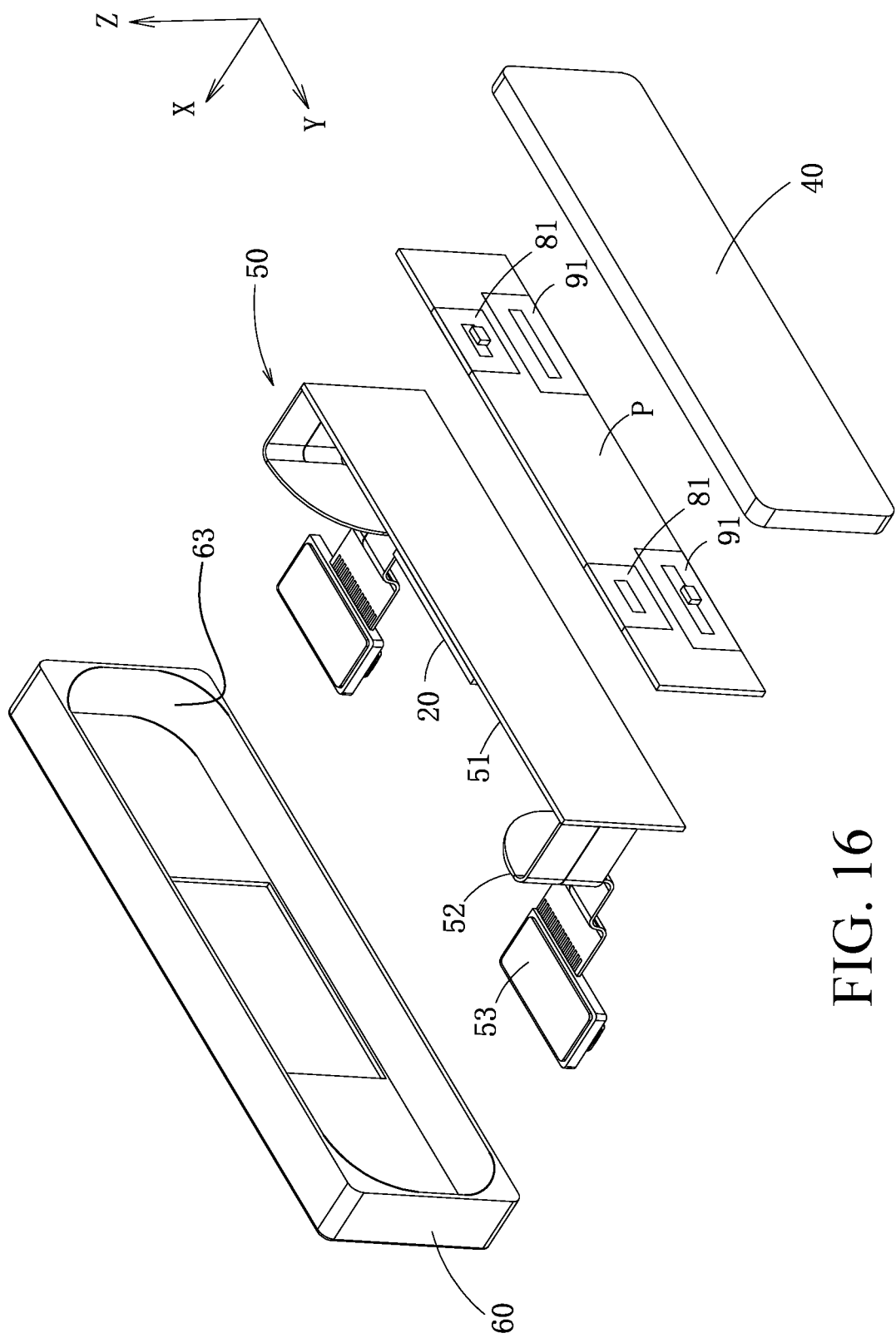
FIG. 16 is an exploded view of a camera device according to another embodiment of the present disclosure, which can be simultaneously activated with the first moving module and a group of second moving modules shown in FIG. 15 to rotate the image sensor around the third axis.

FIG. 16 is an exploded view of a camera device according to another embodiment of the present disclosure. In this embodiment, the inner side of the cover 60 forms an inner side wall for accommodating the image sensor 20 to form an arc-shaped wall 63. When the first moving module 80 disposed at the upper right corner of the baseplate body 51 and the second moving module 90 disposed at the lower left corner as shown in FIG. 15 are activated at the same time, the first moving module 80 would exert a force along the first axis direction (Y direction) to the baseplate body 51, and the second moving module 90 would exert a force along the second axis direction (Z direction) to the baseplate body 51. So, the resultant force of the force exerted by the first moving module 80 and the force exerted by the second moving module 90 to the baseplate body 51 causes the baseplate body 51 to move obliquely and abut against the arc-shaped wall 63. Meanwhile, the clockwise moment generated by the first moving module 80 and the second moving module 90 to the baseplate 50 causes the baseplate body 51 to rotate around the third axis (X direction) guided by the arc-shaped wall 63.

In the camera device of embodiments of the present disclosure, by the first moving module and the second moving module, the image sensor could move linearly along the direction of the first axis when the first moving module is activated, and the image sensor could move linearly along the direction of the second axis when the second moving module is activated, where the first axis intersects with the second axis. Thus, when the two second moving modules are activated at the same time, the sum of the moments generated by the two second moving modules relative to the third axis to the image sensor would cause the image sensor to rotate clockwise or counterclockwise around the third axis, so that the image sensor could compensate for the image by linear movement in the direction of the first axis and the second axis, while the image is compensated by rotating in the direction of the third axis, as a result of three-axis image stabilization. Although this embodiment takes a periscope lens as an example for description, the present disclosure is not limited thereto; general optical lenses are also applicable.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A camera device, comprising:
   an image sensor;
   a first moving module connected to the image sensor, the first moving module being configured to be activated to enable the image sensor to move linearly along a first axis; and
   at least one group of second moving modules connected to the image sensor, the at least one group of second moving modules being configured to be activated to linearly move the image sensor along a second axis, the second axis intersecting with the first axis;
   a baseplate comprising a baseplate body, two bending parts disposed on two opposite sides of the baseplate body, and two electrical connectors disposed at the two bending parts, each of the bending parts comprises a first bending sheet and a second bending sheet; the first bending sheet is connected to the baseplate body, and the first bending angle is formed between the first bending sheet and the baseplate body; the second bending sheet is connected to the first bending sheet; a second bending angle is formed between the second bending sheet and the first bending sheet; the electrical connector is connected to the second bending sheet;
   wherein the first moving module or/and the at least one group of the second moving modules are configured to be activated to rotate the image sensor around a third axis, and an axial rotation of the image sensor is generated by a thrust differential of the first axis and the second axis.

2. The camera device according to claim 1 comprising two groups of second moving modules, the at least two groups of second moving modules being respectively disposed at two opposite sides of the image sensor and being parallel to a force direction of the image sensor with a predetermined distance, the at least two groups of second moving modules being simultaneously activated to enable the image sensor to move linearly along the second axis or to rotate the image sensor around the third axis.

3. The camera device according to claim 1, wherein the baseplate body carrying the image sensor, the first moving module and the at least one group of second moving modules being connected to the baseplate, the first moving module or the at least one group of second moving modules being configured to enable the baseplate to linearly move along the first axis, to linearly move along the second axis, or to rotate about the third axis.

4. The camera device according to claim 3, wherein the baseplate is a flexible circuit board; each of the bending parts is connected to the corresponding electrical connector and the baseplate body; the two bending parts and the baseplate body comprise a first bending angle; the image sensor is electrically connected to the electrical connector through the flexible circuit board.

5. The camera device according to claim 1, wherein the two first bending sheets are respectively connected to two opposite ends of the baseplate body along the first axis; each of the first bending sheets is bent relative to the baseplate body along the third axis to form the first bending angle; each of the second bending sheets is connected to one end of the corresponding first bending sheet away from the baseplate body along the third axis; each of the second bending sheets is bent relative to the first bending sheet along the first axis to form the second bending angle.

6. The camera device according to claim 5, wherein each of the bending parts further comprises a third bending sheet; the third bending sheet and the corresponding first bending sheet are respectively connected to two adjacent side edges of the corresponding second bending sheet; a third bending angle is formed between the third bending sheet and the corresponding second bending sheet; the electrical connector is disposed at one end of the corresponding third bending sheet.

7. The camera device according to claim 6, wherein each of the third bending sheets is connected to one end of the corresponding second bending sheet on the second axis; each of the third bending sheets is bent relative to the corresponding second bending sheet along the third axis to form the third bending angle.

8. The camera device according to claim 1, wherein the first moving module comprises a first coil and a first magnet; the first coil or the first magnet is connected to the image sensor; the S pole and the N pole of the first magnet are arranged along the first axis; the first coil is aligned with the first magnet along the third axis.

9. The camera device according to claim 8, wherein each of the at least one group of second moving modules comprises a second coil and a second magnet; the second coil or the second magnet is connected to the image sensor; the S pole and the N pole of the second magnet are arranged along the second axis; the second coil is aligned with the second magnet along the third axis; the two second coils are configured to linearly move the two second magnets along the second axis by electric currents in the same direction, or to rotate the two second magnets about the third axis by electric currents in opposite direction.

10. The camera device according to claim 9 comprising the baseplate supporting the image sensor, the first coil and the second coil being disposed at the baseplate, or the first magnet and the second magnet being disposed at the baseplate.

11. The camera device according to claim 1 comprising an optical imaging module, the image sensor being disposed corresponding to an optical axis of the optical imaging module, the first axis and the second axis being perpendicular to the optical axis of the optical imaging module, the third axis being parallel to the optical axis of the optical imaging module.

12. The camera device according to claim 11 comprising an optical path bending module configured to change a traveling direction of light so that the light would pass through the optical imaging module along the optical axis.

13. A camera device, comprising
an image sensor;
a first moving module connected to the image sensor, the first moving module being configured to be activated to enable the image sensor to move linearly along a first axis;
at least one group of second moving modules connected to the image sensor, the at least one group of second moving modules being configured to be activated to linearly move the image sensor along a second axis, the second axis intersecting with the first axis;
a baseplate comprising a baseplate body and two bending parts disposed on two opposite sides of the baseplate body;
a base and a sliding mechanism, the baseplate body being slidably assembled to the base through the sliding mechanism;
wherein the first moving module or/and the at least one group of the second moving modules are configured to be activated to rotate the image sensor around a third axis, and an axial rotation of the image sensor is generated by a thrust differential of the first axis and the second axis.

14. The camera device according to claim 13, wherein the sliding mechanism comprises a plurality of sliding grooves disposed at the base and a plurality of balls disposed in the sliding grooves, respectively; the baseplate is in contact with the balls.

15. The camera device according to claim 13 comprising a cover combined with the base, an accommodating space existing between the cover and the base, the baseplate body being disposed in the accommodating space, the cover comprising a first opening and two second openings, the first opening corresponding to the image sensor, the two bending parts extending to an outer side of the accommodating space through the two second openings respectively.

16. A camera device, comprising:
an image sensor;
a first moving module connected to the image sensor, the first moving module being configured to be activated to enable the image sensor to move linearly along a first axis, wherein the first moving module comprises a first coil and a first magnet;
at least one group of second moving modules connected to the image sensor, the at least one group of second moving modules being configured to be activated to linearly move the image sensor along a second axis, the second axis intersecting with the first axis, wherein the at least one group of second moving modules comprises a second coil and a second magnet;

a baseplate;

wherein the first moving module or/and the at least one group of the second moving modules are configured to be activated to rotate the image sensor around a third axis, and an axial rotation of the image sensor is generated by a thrust differential of the first axis and the second axis;

wherein the baseplate is disposed between the first magnet and the first coil; the baseplate is disposed between the second magnet and the second coil.

17. The camera device according to claim 10 comprising a carrying plate, wherein the first coil and the second coil are disposed at the carrying plate, the baseplate is secured to the carrying plate, and the first magnet and the second magnet are movably disposed relative to the baseplate; or, the first coil and the second coil are disposed at the carrying plate, the baseplate and the carrying plate are movably relative to each other, and the first magnet and the second magnet are disposed at the baseplate.

* * * * *